(12) United States Patent
Aigner

(10) Patent No.: US 7,895,892 B2
(45) Date of Patent: Mar. 1, 2011

(54) APPARATUS AND METHOD FOR DETECTING A ROTATION

(75) Inventor: Robert Aigner, Ocoee, FL (US)

(73) Assignee: Infineon Technologies AG, Neubiberg (DE)

( * ) Notice: Subject to any disclaimer, the term of this patent is extended or adjusted under 35 U.S.C. 154(b) by 113 days.

(21) Appl. No.: 12/346,287

(22) Filed: Dec. 30, 2008

(65) Prior Publication Data

US 2009/0188317 A1    Jul. 30, 2009

Related U.S. Application Data

(63) Continuation of application No. PCT/EP2007/003908, filed on May 3, 2007.

(60) Provisional application No. 60/818,235, filed on Jun. 30, 2006.

(51) Int. Cl.
*G01P 9/00* (2006.01)
*G01C 19/56* (2006.01)

(52) U.S. Cl. .................. 73/504.01; 73/504.04

(58) Field of Classification Search .............. 73/504.01, 73/504.02, 504.04, 504.05, 504.12
See application file for complete search history.

(56) References Cited

U.S. PATENT DOCUMENTS

| | | | |
|---|---|---|---|
| 3,905,235 A | | 9/1975 | Shaw |
| 4,061,040 A | * | 12/1977 | Shaw ...................... 73/504.01 |
| 4,126,047 A | * | 11/1978 | Sethares et al. .......... 73/504.01 |
| 4,167,120 A | * | 9/1979 | Shaw et al. .............. 73/504.01 |
| 4,384,409 A | * | 5/1983 | Lao ............................. 33/318 |
| 4,516,427 A | * | 5/1985 | Carey ...................... 73/504.01 |
| 4,672,848 A | * | 6/1987 | Gohin et al. ............. 73/504.05 |
| 4,903,531 A | * | 2/1990 | LeBlond et al. ......... 73/504.05 |
| 5,097,707 A | * | 3/1992 | Church .................... 73/504.01 |
| 6,516,665 B1 | * | 2/2003 | Varadan et al. .......... 73/504.01 |
| 7,543,496 B2 | * | 6/2009 | Ayazi et al. .............. 73/504.12 |

OTHER PUBLICATIONS

Abe, H., et al., "Energy Trapping of Thickness-Shear Vibrations Excited by Parallel Electric Field and Its Application to Piezoelectric Vibratory Gyroscopes," IEEE Ultrasonics Symposium, 1998, pp. 467-471.
Jakoby, B., et al., "The Potential of Microacoustic SAW-and BAW-Based Sensors for Automotive Applications—A Review," IEEE Sensors Journal, Oct. 2002, vol. 2, No. 5, pp. 443-452.
Johari, H., et al., "Silicon-On-Insulator Bulk Acoustic Wave Disk Resonators," IEEE International SOI Conference Proceedings, 2006, pp. 153-154.
Yang, J., "A Review of Analyses Related to Vibrations of Rotating Piezoelectric Bodies and Gyroscopes," IEEE Transactions on Ultrasonics, Ferroelectrics and Frequency Control, May 2005, vol. 52, No. 5, pp. 698-706.
Yang, J. S., et al., "Analysis of a Plate Piezoelectric Gyroscope by Equations for a Piezoelectric Parallelepiped," 1999 Joint Meeting EFTF—IEEE IFCS, 1999, pp. 433-436.

* cited by examiner

*Primary Examiner*—Helen C. Kwok
(74) *Attorney, Agent, or Firm*—Slater & Matsil, L.L.P.

(57) ABSTRACT

A rotation sensor has a substrate with a first surface and a second surface. A shear-wave transparent mirror is arranged on the first surface of the substrate, and a shear-wave isolator is arranged above the shear-wave transparent mirror, the shear-wave transparent mirror and the shear-wave isolator being arranged separated from each other to define a Coriolis zone there between. A bulk-acoustic-wave resonator is arranged above the shear-wave isolator, and a shear-wave detector is arranged on the substrate in a direction, in which a shear-wave generated by the bulk-acoustic-wave resonator upon rotation propagates.

31 Claims, 8 Drawing Sheets

APPARATUS AND METHOD FOR DETECTING A ROTATION

This application is a continuation of co-pending International Application No. PCT/EP2007/003908, filed May 3, 2007, which designated the United States and was published in English, and which claims the benefit of U.S. Provisional Application No. 60/818,235, filed Jun. 30, 2006, both of which applications are incorporated herein by reference.

BACKGROUND

The present invention concerns an apparatus and a method for detecting a rotation, especially an apparatus and a method for detecting a rotation on the basis of bulk acoustic waves.

Conventional approaches for detecting a rotation about an axis use gyroscopes, e.g., MEMS gyroscopes (MEMS=micro-electromechanical system). Conventional MEMS gyroscopes are complicated vibrating micro-structures manufactured by surface-micromachining processes. Gyroscopes are based on measuring the Coriolis force. The Coriolis force is a small force perpendicular to both the velocity vector of a mass and the rotation axis. In a vibratory gyroscope the Coriolis force is proportional to a rotation (yaw) rate, the vibration frequency and the mass of the vibrating mass.

In general, the Coriolis force is detected capacitively on the basis of a displacement of sensing electrodes in a direction perpendicular to the direction of the driven motion. Major problems occur in gyroscopes due to the so-called quadrature errors; these errors are related to non-ideal drive motion or driving force coupling energy into the sense or detection direction. As the Coriolis force results in a displacement, which is, in general, by a factor of 10,000 smaller than the driven motion, the construction of MEMS gyroscopes is challenging and the electronic circuitry to operate the device is complex. Conventional MEMS gyroscopes are too expensive for true volume applications while they do not have the necessitated degree of accuracy needed in specific applications, e.g., in navigation systems.

An improvement of the sensitivity of gyroscopes can be obtained by maximizing a sensing or detection signal generated due to the Coriolis force. Maximizing the detection signal is possible by (a) increasing the mass in the gyroscope, (b) increasing the vibration frequency, (c) increasing the vibration amplitude, and/or (d) improving the displacement sensing.

The first approach (a) is disadvantageous in that also the size of the overall device needs to be increased. Further, manufacturing such a device becomes difficult. The second approach (b) is not possible with MEMS gyroscopes since these devices work best at 10 kHz. At higher frequencies the vibration amplitude becomes smaller which, however, would be in contradiction to (c). The third approach (c) is rather limited with MEMS gyroscopes as the suspension structures, like springs, and the driving force generating structures, like comb drives, do not allow a displacement exceeding ±5 μm. The fourth approach (d) is limited by the above mentioned quadrature error and the noise limit of the amplifiers used in the detection circuitry.

Conventional gyroscopes use a combination of (a), (c) and (d) to increase the detection limit.

SUMMARY OF THE INVENTION

In accordance with embodiments of the present invention a rotation detection apparatus comprises means for generating a bulk-acoustic wave, and means for detecting a shear-wave generated from the bulk-acoustic wave upon rotation.

In accordance with further embodiments of the present invention a method for detecting a rotation comprises generating a bulk-acoustic wave, and detecting a shear-wave generated from the bulk-acoustic wave upon rotation.

In accordance with yet further embodiments of the present invention a bulk-acoustic-wave resonator is used to detect a rotation.

An advantage of embodiments of the present invention is that the sensitivity of a rotation sensor is highly increased.

BRIEF DESCRIPTION OF THE DRAWINGS

Features of the invention will be more readily appreciated and better understood by reference to the following detailed description, which should be considered with reference to the accompanying drawings, in which.

DETAILED DESCRIPTION OF ILLUSTRATIVE EMBODIMENTS

Figure 1:
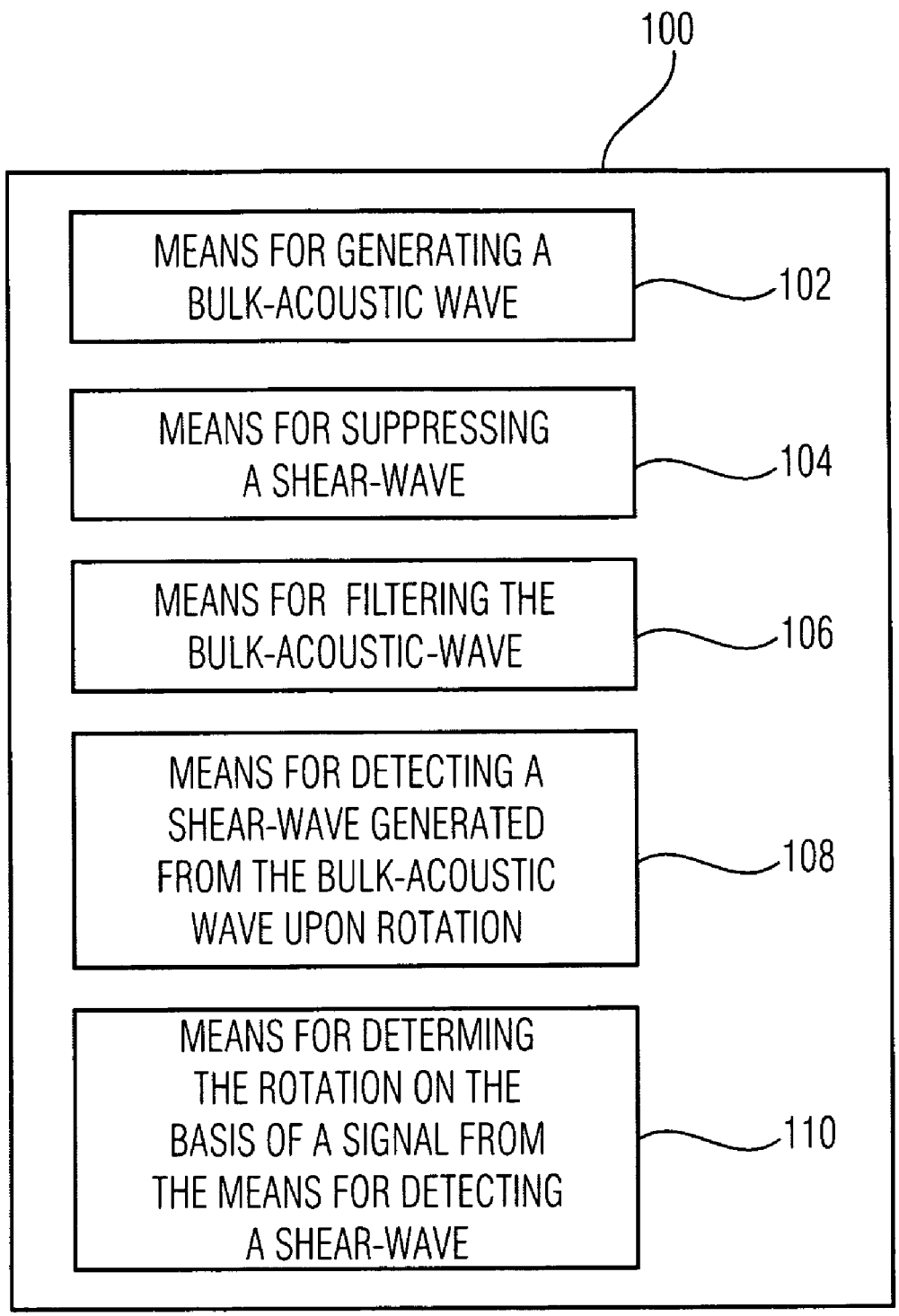
FIG. 1 is a block diagram of a rotation sensor in accordance with an embodiment of the present invention.

In accordance with embodiments of the present invention a rotation sensor is provided having a sensitivity which is highly increased when compared to conventional MEMS rotation sensors. This increase in sensitivity is achieved by a dramatic increase of the vibration frequency. This increase is possible by using a bulk-acoustic-wave device (bulk-acoustic-wave=BAW), which yields an increase in the frequency by a factor of $10^6$ in comparison to conventional MEMS gyroscopes. Instead of a vibration frequency of 10 kHz typically used in MEMS gyroscopes, this approach allows vibration frequencies up to 10 GHz. While a BAW based rotation sensor shows considerably smaller vibration amplitudes when compared to conventional devices, e.g., 5 nm with BAW based devices instead of 5 μm of conventional devices (by a factor of $10^3$ smaller), the gain in sensitivity is still a factor of about 1,000. Conventional MEMS devices will not work at 10 GHz at all, but BAW devices will operate at such a frequency without any problems.

The embodiments of the present invention use the following approach to sense a perpendicular motion by the Coriolis force. A thin film BAW resonator is provided which generates acoustic standing waves in a vertical direction (vertical with respect to the substrate or the chip on which the resonator is formed), the z-direction. Predominantly, the wave type is of "longitudinal" nature, i.e., the particle motion is purely vertical (in the propagation direction of the forward or reverse wave). In case a rotation rate with an axis parallel to the chip plane (x-direction or y-direction) is present, the particle motion is subject to the Coriolis force and an in-plane motion will be generated. In terms of acoustics, this in-plane motion constitutes a "shear" type wave, which propagates or travels in the vertical direction. The amplitude of the shear-wave is measured to determine the rotation rate.

In accordance with the above sensing principle the shear-wave content is measured at certain locations of a BAW resonator. Embodiments of the present invention apply the following approaches for the detection of shear-waves. In accordance with a first approach, a piezoelectric layer or piezolayer having a tilted grain orientation is used as a shear-wave sensor. In accordance with a second approach, a conversion element is provided to convert shear-waves into longitudinal waves, e.g., by using non-parallel front and back planes of the device or a prism-shaped chip, or by using a wave grating at the backside of the substrate, which reflects the shear-wave under a certain angle. In accordance with a third approach, BAW resonators having fine-structured unequally mass-loaded top and bottom electrodes are used as detectors.

As real BAW resonators may not generate pure longitudinal waves, embodiments of the present invention provide a wave-type filter to improve sensitivity. The wave-type filter is a stack of layers having different acoustic impedances and thicknesses. While conventional acoustic reflectors can be optimized to reflect longitudinal waves and shear-waves at the same time, embodiments of the present invention use acoustic reflectors which reflect shear-waves very well, but are transparent for longitudinal waves.

Embodiments of the present invention provide a BAW gyroscope comprising a drive BAW resonator that is operated at high amplitude and creates dominant longitudinal waves. Longitudinal waves with high amplitude imply, namely oscillations with a high displacement perpendicular to the rotation axis and hence are especially exposed to the Coriolis force. It is assumed in the following, that the BAW resonator generates a longitudinal wave propagating from an upside to a downside direction. Then, underneath the drive BAW resonator there is the above described filter or shear-wave isolator which cleans out the shear-wave-content from the drive resonator. Below the shear-wave isolator a Coriolis zone is located. In this zone the shear-wave is generated by the Coriolis force in the presence of a rotation or a rotation rate. In the most simple case, this zone is just one layer of heavy material. A shear-wave transparent mirror is arranged below the Coriolis zone. The shear-wave transparent mirror is an acoustic reflector which reflects longitudinal waves very well, but is substantially transparent to shear-waves so that substantially only shear-waves created in the Coriolis zone are present below the shear-wave transparent mirror. Further, a shear-wave detector is provided to allow read-out of a signal indicative of the rotation or rotation rate.

The advantage of a BAW based rotation sensor or gyroscope when compared to MEMS gyroscopes is not only the higher sensitivity, but also the smaller device size, the low costs, the high robustness and the simple interface to electronics. The BAW rotation sensor or gyroscope does not need to be packed in a vacuum environment, since any potential losses due to air damping are irrelevant.

An advantage of further embodiments of the present invention using multiple BAW based rotation sensors is that by combining rotation sensors which differ by a different tilting of the grain of the piezoelectric layer or by arranging the rotation sensors at different locations, a rotation about different rotation axes at the same time can be detected.

In accordance with embodiments of the present invention a rotation sensor comprises a substrate, a bulk-acoustic-wave generator arranged on the substrate, and a shear-wave detector arranged on the substrate in a direction in which a shear-wave generated by the bulk-acoustic-wave generator upon rotation propagates.

In accordance with embodiments of the present invention a rotation sensor comprises a substrate comprising a first surface and a second surface, a shear-wave transparent mirror arranged on the first surface of the substrate, a shear-wave isolator above the shear-wave transparent mirror, wherein the shear-wave transparent mirror and the shear-wave isolator are arranged separated from each other to define a Coriolis zone there between, a bulk-acoustic-wave resonator arranged above the shear-wave isolator, and a shear-wave detector arranged on the substrate in a direction, in which a shear-wave generated upon rotation from a bulk-acoustic-wave, which in turn is generated by the bulk-acoustic-wave resonator propagates. Without rotation no shear-waves are generated and a presence of the rotation causes the Coriolis force, to split the longitudinal wave into a shear-wave and a remaining longitudinal wave. The shear-wave detector is arranged either on the first surface of the substrate, laterally offset from the BAW resonator or on the second surface of the substrate substantially opposite to the bulk-acoustic-wave resonator. In the former case, a reflector is provided on the second surface of the substrate.

FIG. 1 is a block diagram of a rotation sensor 100 in accordance with an embodiment of the present invention. The rotation sensor 100 comprises means 102 for generating a bulk-acoustic wave, means 104 for suppressing a shear-wave, means 106 for filtering the bulk-acoustic-wave, means 108 for detecting a shear-wave generated from the bulk-acoustic wave upon rotation, and means 110 for determining the rotation on the basis of a signal from the means for detecting a shear-wave.

Figure 2:
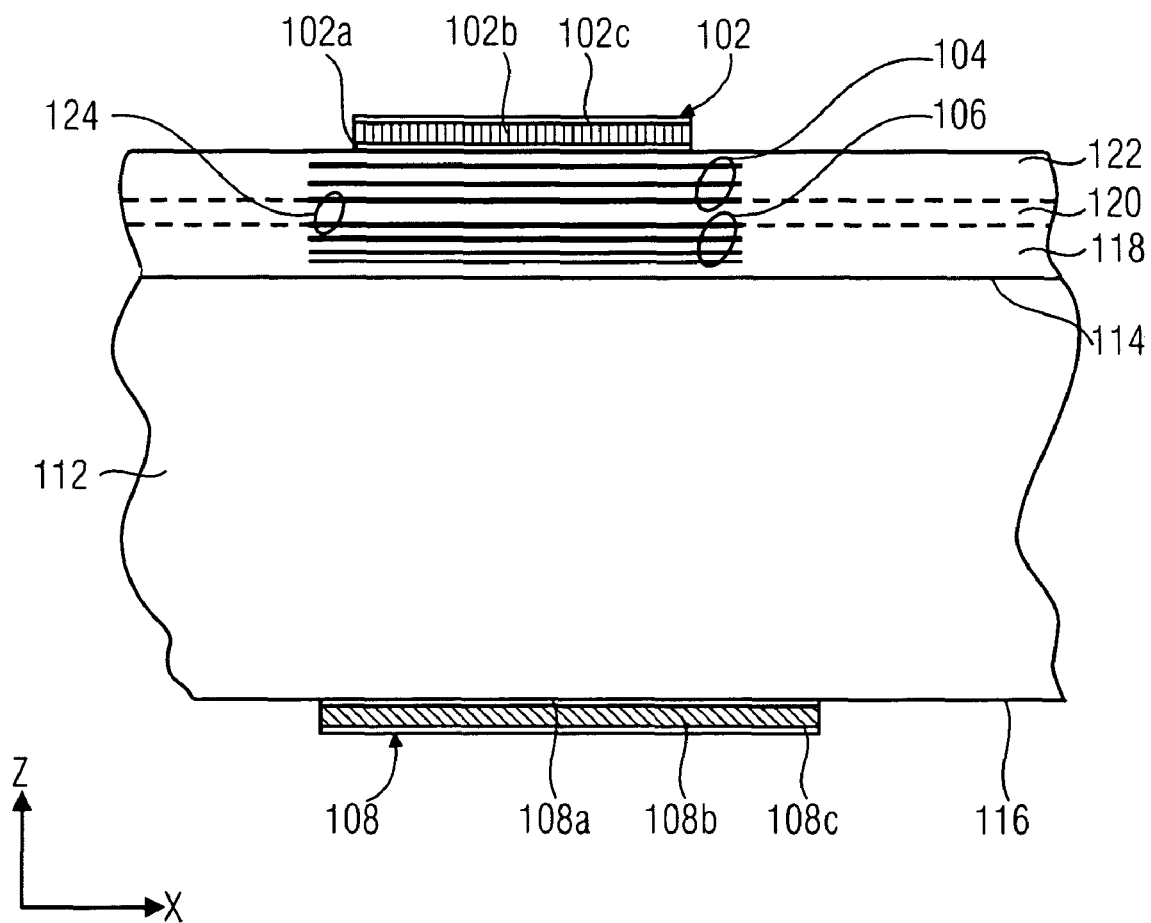
FIG. 2 is a cross-sectional view of a rotation sensor in accordance with an embodiment of the present invention having one shear-wave detector arranged at a lower surface of a substrate.

FIG. 2 is a cross-sectional view of a rotation sensor in accordance with an embodiment of the present invention. The rotation sensor comprises a substrate 112 having a first surface (upper or top surface) 114 and a second surface (lower or bottom surface) 116. On the upper surface 114 of the substrate 112 a plurality of layers is arranged, a lower layer 118, a middle layer 120 and an upper layer 122. Within the lower layer 118, a shear-wave transparent mirror is formed acting as the means 106 for filtering the bulk-acoustic-wave. Within the upper layer 122, a shear-wave isolator is embedded acting as the means 104 for suppressing a shear-wave. Between the shear-wave transparent mirror 106 and the shear-wave isolator 104, a Coriolis zone 124 is formed in the middle layer 120. On the upper layer 122 a bulk acoustic wave resonator (BAW resonator) acting as the means 102 for generating a bulk-acoustic wave is provided. The BAW resonator 102 comprises a bottom electrode 102a on top of which a piezoelectric layer 102b is arranged. On top of the piezoelectric layer 102b, an upper electrode 102c of the BAW resonator is formed. On the lower surface 116 of the substrate 112 a shear-wave detector acting as means 108 for detecting a shear-wave generated from the bulk-acoustic wave upon rotation is formed. The shear-wave detector 108 is arranged substantially opposite to the BAW resonator 102 to receive the shear waves generated upon rotation. As can be seen, in this embodiment the shear-wave detector 108 for detecting the shear-wave generated from the bulk-acoustic wave upon rotation is formed of a lower electrode 108a arranged on the lower surface 116 of the substrate 112, a piezoelectric layer 108b, and an upper electrode 108c formed on the piezoelectric layer 108b. The BAW resonator 102 and the shear-wave detector 108 are connected by appropriate connections (not shown in FIG. 2) to external circuitry (not shown in FIG. 2) for providing a suitable driving signal to the BAW resonator 102 and for obtaining from the detector 108 a signal indicative of a rotation. The external circuitry comprises the means for determining the rotation on the basis of a signal from the detector 108.

The BAW gyroscope of FIG. 2 is provided on the substrate 112, which is a double-side processed wafer. The rotation-sensitive axis is perpendicular to the drawing plane, i.e., the rotation-sensitive axis is parallel to the y-axis. The drive resonator or BAW resonator 102 generates dominantly longitudinal acoustic waves. Shear-waves unintentionally created by the BAW resonator 102 cannot penetrate through the shear-wave isolator 104 but longitudinal waves pass through. In the Coriolis zone 124, upon rotation, a shear-wave is generated which is proportional to the rotation rate. The shear-waves from the Coriolis zone 124 pass through the shear-wave transparent mirror 106, but longitudinal waves are reflected back upwards, i.e., the reflected longitudinal wave propagates along the z-direction (energy trapping for longitudinal waves). The shear-wave detector 108 at the bottom of the substrate 112 comprises a tilted grain piezoelectric layer or piezolayer 108b to create an electrical signal from an incoming shear-wave.

The BAW gyroscope of FIG. 2 operates as follows. Predominantly, the wave type generated in the BAW resonator 102 is of longitudinal nature, meaning that the particle motion is purely vertical, i.e., forward and backward along the z-direction. In case of a rotation with an axis parallel to the chip plane, i.e., a rotation about the x-direction and/or the y-direction, the particle motion is subject to the Coriolis force and an in-plane motion, i.e., along the x- or y-direction, will be generated. Consider, for example, a rotation about the y-axis, which is perpendicular to the drawing plane in FIG. 2. The longitudinal wave in the z-direction is subject to a Coriolis force acting in the x-direction. This force acts in a way that an oscillating particle in the z-direction, will obtain an additional oscillation along the x-direction, which, in turn, will generate a shear-wave. Similarly, a rotation about the x-direction will cause a Coriolis force acting on a longitudinal wave in the z-direction in a way, that an oscillation along the y-direction will be generated. Again this will cause a different shear-wave when compared to the shear-wave generated upon rotation about the y-axis. Thus, the in-plane motion results in a shear-type wave propagating in the vertical direction, i.e., along the z-direction, and this wave is of a transversal type, i.e., it oscillates in the x- or y-direction. Since the strength of the Coriolis force is proportional to the rotation rate, the amplitude of the shear-wave is a measure for the rotation rate. The shear-wave detector 108 comprises a piezolayer 108b having a tilted grain orientation. The tilting of the grain improves the sensitivity with respect to shear-waves. For example, a tilting in the (x,z)-plane improves the sensitivity with respect to a rotation about the y-axis and a tilting in the (y,z)-plane improves the sensitivity with respect to a rotation about the x-axis.

Figure 3A:
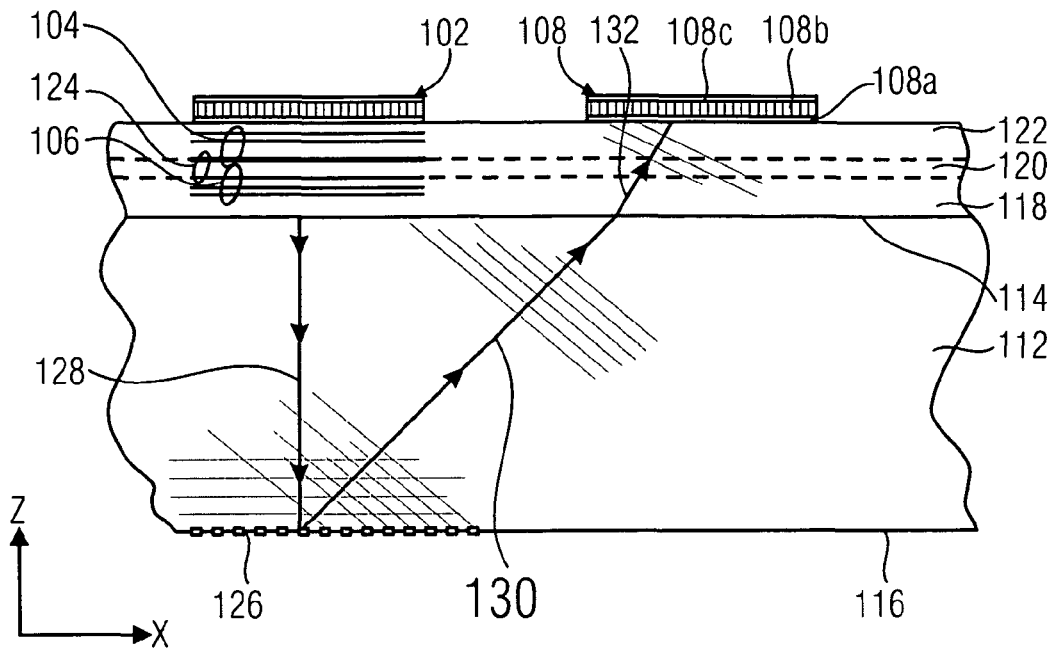
FIG. 3A is a cross-sectional view of a rotation sensor in accordance with an embodiment of the present invention having a shear-wave detector arranged at an upper surface of a substrate.

FIG. 3A is a cross-sectional view of a rotation sensor in accordance with an embodiment of the present invention. Except for the arrangement of the detector 108, this embodiment is similar to the one described with regard to FIG. 2. Instead of providing the detector 108 on the lower surface of the substrate, the detector is provided on the upper layer 122 laterally offset from the BAW resonator 102. In addition, on the lower surface 116 of the substrate 112, a shear wave reflector 126 is provided.

A shear-wave 128 generated in the Coriolis zone 124 upon rotation propagates along the z-direction and is reflected by the shear-wave reflector 126. A reflected shear-wave 130 propagates towards the detector 108. The layers 118, 120, 122 comprise a material of a different acoustic impedance when compared to the material of the substrate 112 so that the shear-wave 130 will be refracted at the surface 114 of the substrate 112 and the resulting shear-wave 132 is detected by the shear-wave detector 108.

The BAW gyroscope in this embodiment is sensitive to a rotation perpendicular to the drawing plane, i.e., a rotation about an axis parallel to the y-direction. The shear-wave reflector 126 is a line grating at the lower surface 116 of the substrate 112 being etched such that the shear-waves 128 will be reflected. The shear-wave detector 108 comprises a piezolayer 108b having vertically oriented grains for obtaining a partial conversion of the shear-wave 132 into a longitudinal wave, when the shear-wave travels across the interface under any angle other than 90°.

Figure 3B:
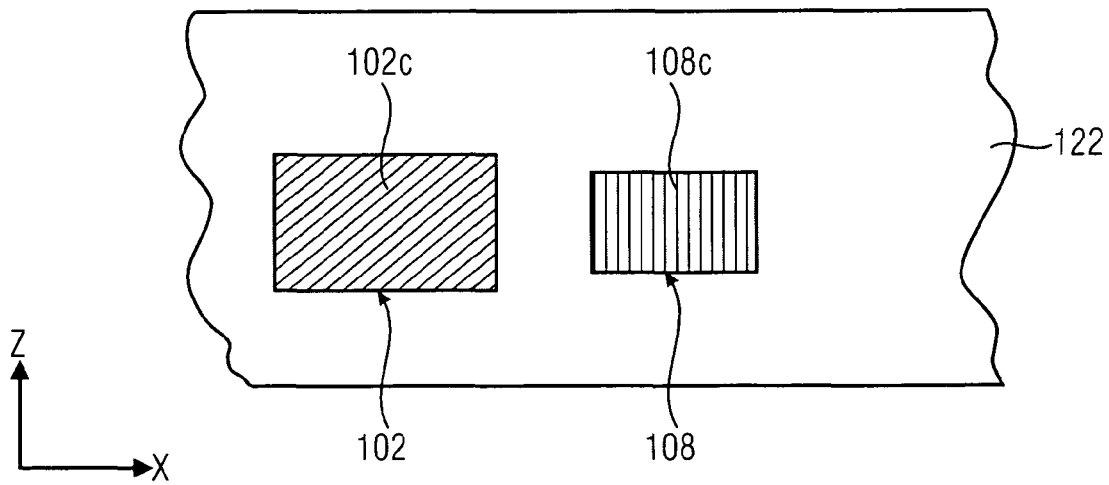
FIG. 3B is a top view on the rotation sensor shown in FIG. 3A.

FIG. 3B is a top view on the rotation sensor shown in FIG. 3A showing the BAW resonator 102 and the shear-wave detector 108 located on the upper surface of the layer 122.

The wavelength of an acoustic wave depends on the propagation material, wherein a shear-wave has often a wavelength of approximately a few micrometers. The lower and upper electrodes 108a and 108c of the shear-wave detector 108 are separated from each other by a distance, which is, for example, smaller or approximately equal to one half of the wavelength of the detected acoustic wave. If the reflected shear-wave 130 propagates from the shear-wave reflector 126 to the shear-wave detector 108 along a path, which arrives at the first surface 114 under an angle of, for example, 45 degrees (or another angle of less than 90°), a constructive or destructive interference of different parts of the reflected shear-wave 130 may occur in the shear-wave detector 108. A reason for this is, that, due to the inclination of the different planes of wave fronts of the reflected shear-wave 130, different wave fronts will enter the shear-wave detector 108 simultaneously and therefore different wave fronts of the reflected shear-wave 130 may interfere with each other. In order to avoid these possible interferences of inclined wave fronts the shear-wave detector 108 can have a lateral dimension so that, depending on the inclination angle, only one wave front of the reflected shear-wave 130 enters the shear-wave detector 108 at a given time.

Figure 3C:
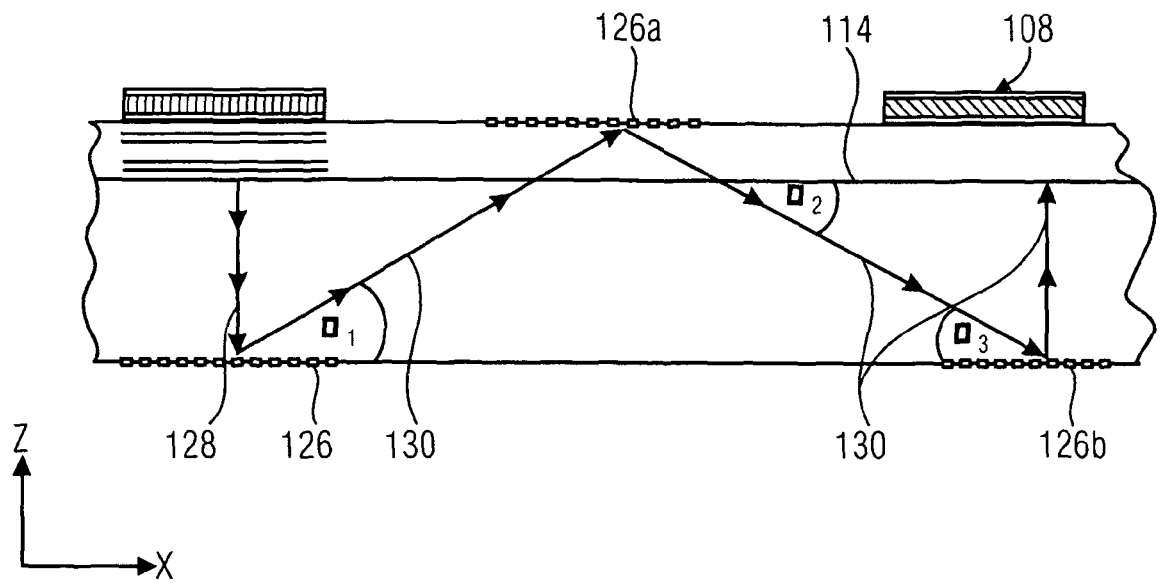
FIG. 3C is a cross-sectional view of a rotation sensor in accordance with an embodiment of the present invention having three shear-wave reflectors.
Figure 3D:
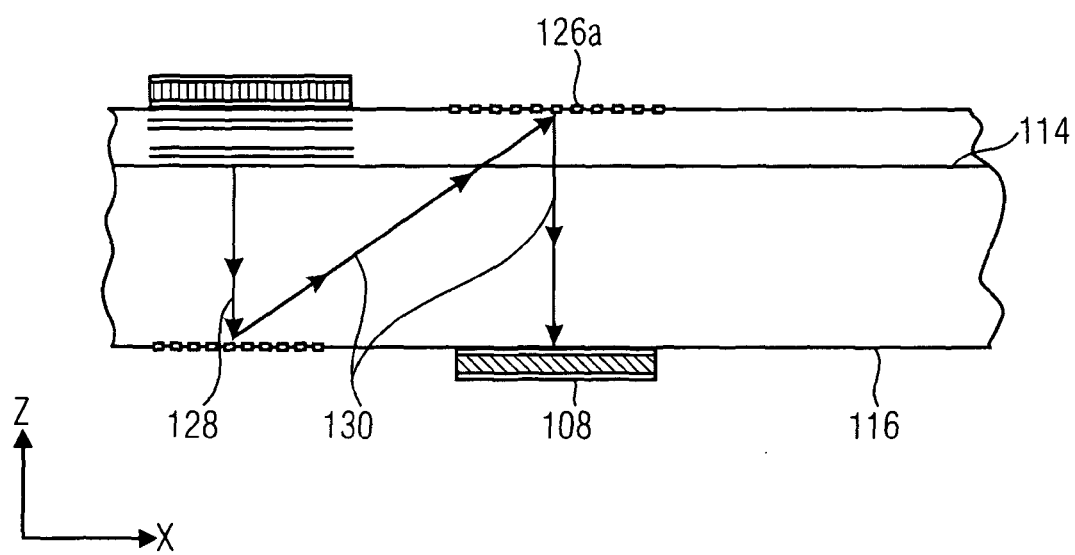
FIG. 3D is a cross-sectional view of a rotation sensor in accordance with an embodiment of the present invention having two shear-wave reflectors

The following embodiments of the present invention, which are shown in FIGS. 3C and 3D, are directed to an arrangement of the inventive rotation sensors, wherein an adjustment of the lateral dimension of the shear-wave detector 108 to a very small width can be avoided, so that a simplified semiconductor manufacturing technology can be utilized and an increased sensitivity of the shear-wave detector 108 can be obtained.

FIG. 3C shows in addition to the shear-wave reflector 126, a second shear-wave reflector 126a and a third shear-wave reflector 126b. Hence, the reflected shear-wave 130 is reflected a second time at the second shear-wave reflector 126a and a third reflection occurs at the third shear-wave reflector 126b. After the third reflection at the shear-wave reflector 126b the propagation path of the reflected shear-wave 130 can be set perpendicular to the first surface 114 and therefore also perpendicular to a lateral surface of the shear wave detector 108. This can be achieved by adjusting the characteristics of reflection of the first to third shear-wave reflectors 126, 126a, 126b.

FIG. 3D shows another embodiment, where the shear-wave reflector 126 is supplemented by a second shear-wave reflector 126a parallel to the first surface 114. The shear-wave 128 is therefore first reflected at the shear-wave reflector 126 and the reflected shear-wave 130 is reflected by the second shear-wave reflector 126a so that, as before, the reflected shear-wave 130 can enter the shear wave detector 108 with a propagation path perpendicular to the second surface 116.

The chosen grating of the shear-wave reflectors 126, 126a and/or 126b will adjust the intensity of distribution of the reflected shear-wave 130. In other words, the angles of reflection $\alpha_1$, $\alpha_2$ and/or $\alpha_3$ of the reflected shear-wave 130 at the shear-wave reflectors 126, 126a and/or 126b depend on the grating of the shear-wave reflectors 126, 126a and 126b and, in an embodiment, the grating is chosen so the shear-wave detector 108 receives the reflected shear-wave 130 with a maximal intensity.

In further embodiments further shear-wave reflectors are added, so that after an odd number of reflections a perpendicular incoming reflected shear-wave 130 is detected by the shear-wave detector 108. In the same way, after an even number of reflections the shear wave detector 108 on the surface 116 detects the reflected shear-wave 130.

Figure 4A:
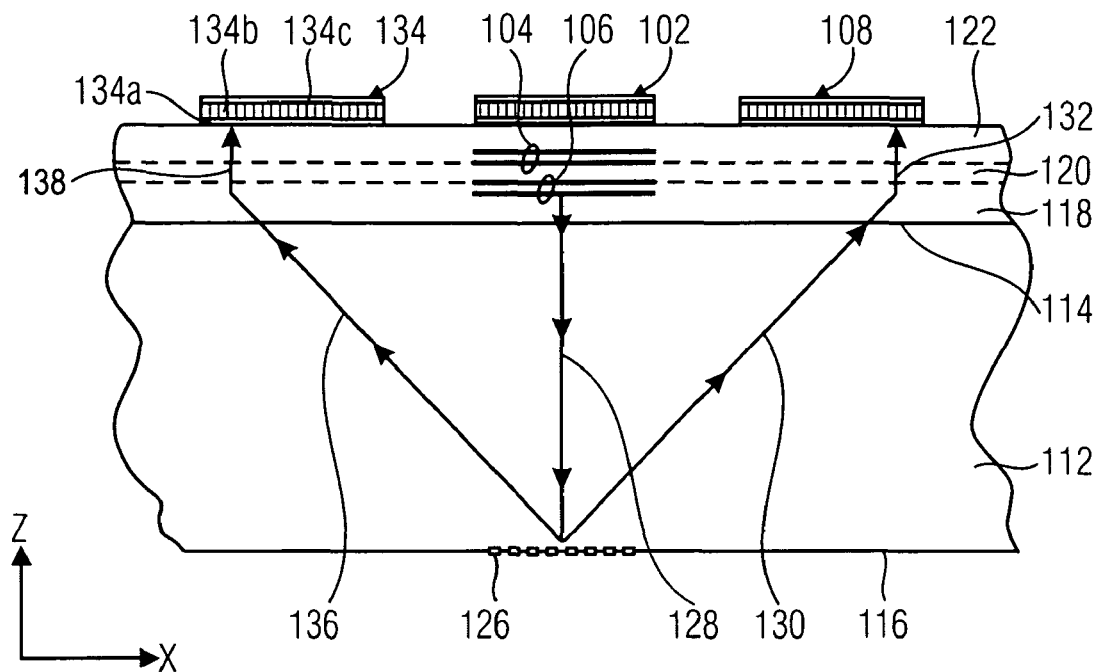
FIG. 4A is a cross-sectional view of a rotation sensor in accordance with an embodiment of the present invention having two shear-wave detectors arranged at an upper surface of a substrate.

FIG. 4A is a cross-sectional view of a rotation sensor in accordance with an embodiment of the present invention having two shear-wave detectors. The embodiment of FIG. 4A is similar to the one described with regard to FIG. 3A except that an additional detector 134 is provided on the upper layer 122 offset from the BAW resonator 102 in a direction opposite to the direction in which the detector 108 is offset from the BAW resonator 102. The additional detector 134 comprises a lower electrode 134a, a piezoelectric layer 134b, and an upper electrode 134c formed on the piezoelectric layer 134b.

The shear-wave 128 generated in the Coriolis zone 124 upon rotation propagates along the z-direction and is reflected by the shear-wave reflector 126. The reflector 126 is provided such that, in addition to the reflected shear wave 130 also a further reflected shear wave 136 is generated which travels towards the additional detector 134. The layers 118, 120, 122 again comprise a material of different acoustic impedance when compared to the material of the substrate 112, so that the reflected shear-wave 130 as well as the further reflected shear-wave 136 are refracted at the interface 114 and a refracted shear-wave 132 is detected in the shear-wave detector 108 and a refracted shear-wave 138 is detected in the shear-wave detector 134. The refracted shear-wave 132 generates a first electrical signal in the shear-wave detector 108, and the refracted shear-wave 138 generates a second electrical signal in the shear-wave detector 134. The first electrical signal and the second electrical signal oscillate with an opposite phase due to the reflection in the opposite x-direction at the reflector 126. If the distance between the shear-wave detector 108 and the shear-wave detector 134 is different by ½ of the wavelength, a differential signal can be measured and perturbations caused by remaining longitudinal waves are eliminated. This is due to the remaining longitudinal waves entering the shear-wave detector 108 and the shear-wave detector 134 having the same phase and cancelling when a differential signal is used. This differential structure is advantageous to reduce cross talk between the BAW resonator 102 and the sense signals. By providing the additional shear-wave detector 134 in a manner as discussed above a differential signal will be seen at the two detectors. A common mode equal to the electrical cross-talk can be eliminated by this arrangement.

Figure 4B:
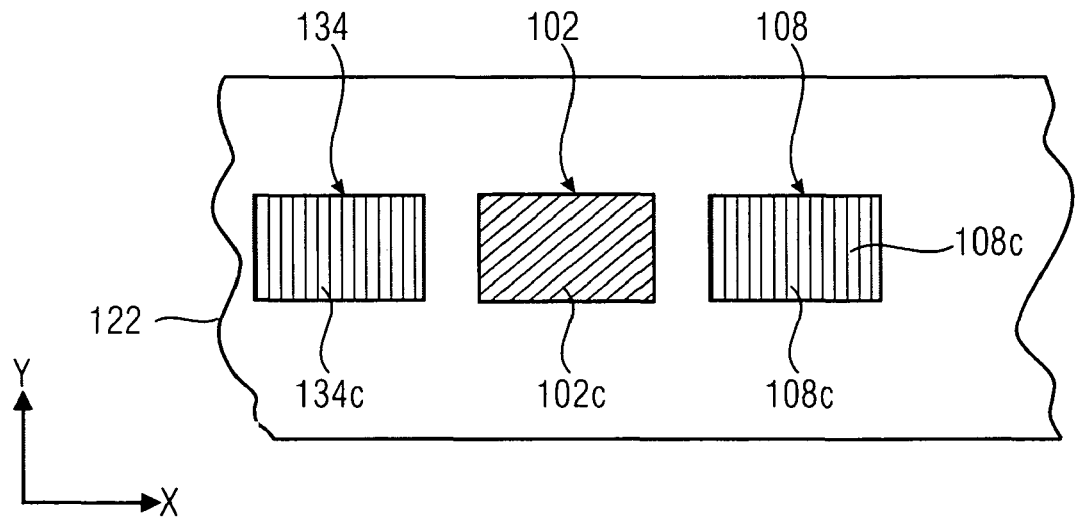
FIG. 4B is a top view of the rotation sensor shown in FIG. 4A.

FIG. 4B is a top view of the rotation sensor shown in FIG. 4A. The BAW resonator 102 and the two shear-wave detectors 108 and 134 are located along a straight line.

Figure 4C:
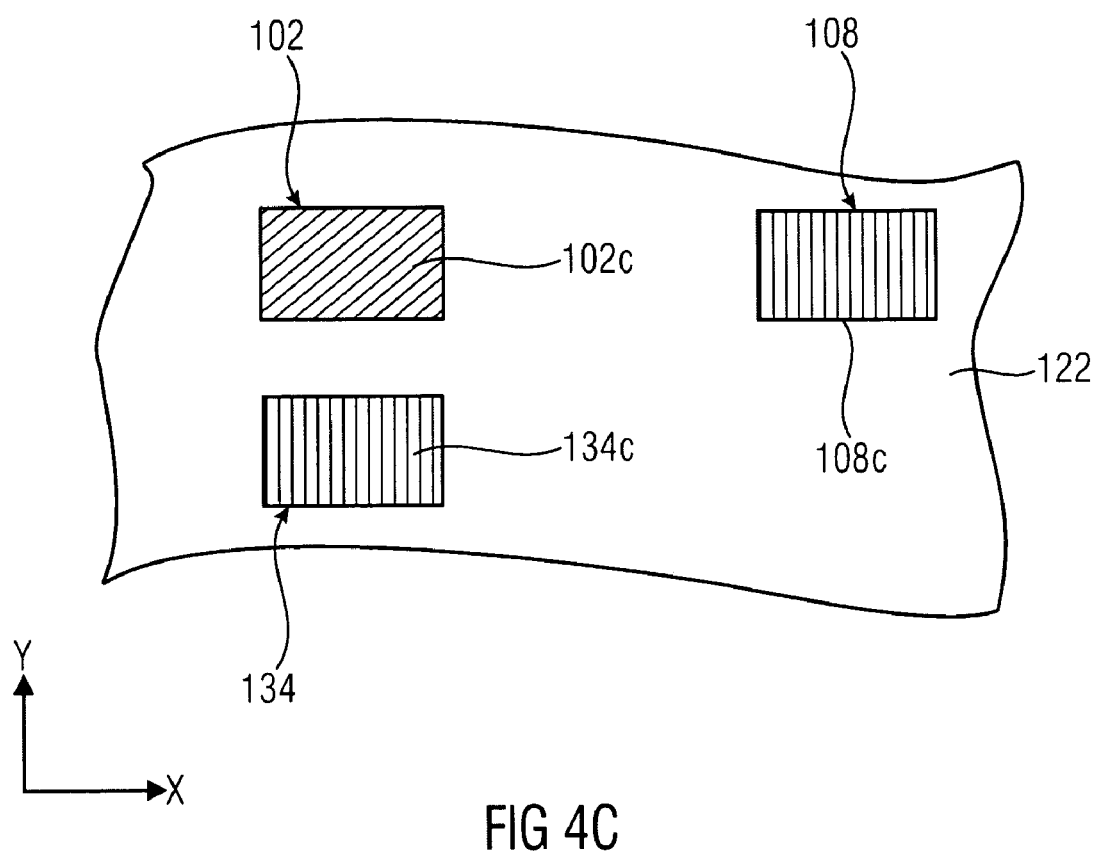
FIG. 4C is a top view of a rotation sensor similar to the one shown in FIG. 4A, wherein the two shear-wave detectors are arranged at right angles to detect rotations about two different rotation axes.
Figure 4D:
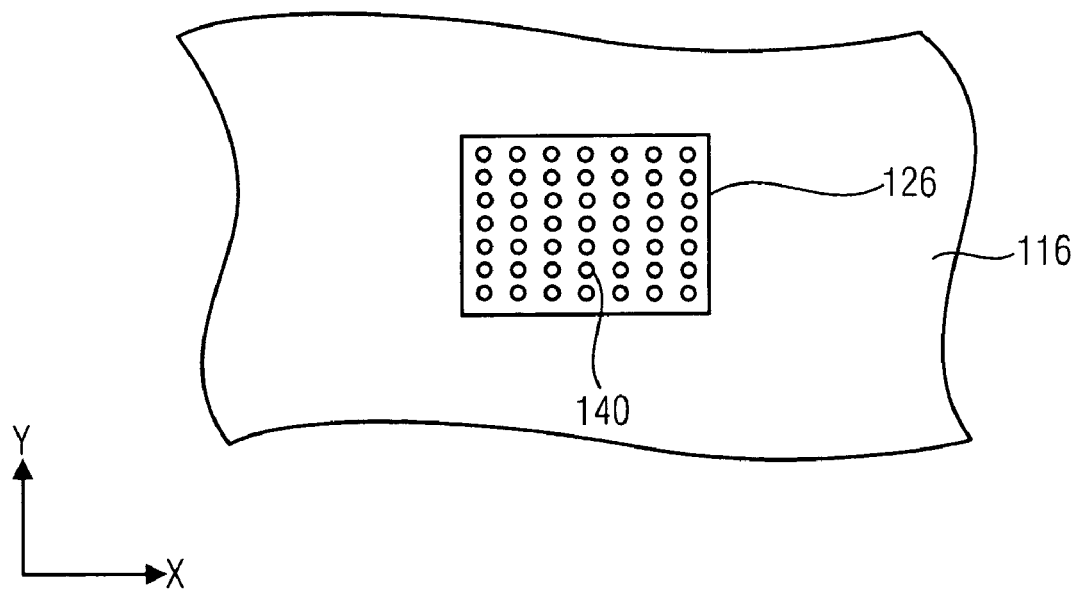
FIG. 4D is a bottom view of the rotation sensor shown in FIG. 4C showing a shear-wave reflector formed by a dot-grating.

FIG. 4C is the top view of the rotation sensor similar to the one shown in FIG. 4A except that the shear-wave detector 108 and the shear-wave detector 134 are not aligned along a straight line. Rather, the shear-wave detectors 108 and 134 are arranged substantially perpendicular to each other. In this embodiment, the primary shear-wave (not shown in FIG. 4C) which propagates in the substrate 112 along the z-direction is reflected at the bottom side of the substrate in the x-direction and in the y-direction due to the fact that instead of a line grating a dot grating 140 is formed at the lower surface 116 of the substrate 112, as is shown in FIG. 4D. This arrangement of the shear-wave detectors 108 and 134 allows to distinguish between rotations about two axes, a rotation about the y-directions and a rotation about the x-direction. To be more specific, the shear-wave detector 108 is sensible with respect to a rotation about the y-direction, while the shear-wave detector 134 is sensible with respect to a rotation about the x-direction.

With other words, it is possible to use a dot grating 140 for the shear-wave reflector 126 on the bottom surface 116 of the substrate 112 and to use one drive resonator or BAW resonator 102, but a shear-wave detector at each side of the drive resonator of BAW resonator 102 to obtain a two-axis gyroscope. The dot-grating 140 for the shear-wave reflector 126 is etched into the lower surface 116 of the substrate 112. Alternatively, a two-axis gyroscope can also be obtained by placing a second structure as shown in FIG. 4A rotated by 90° about the z-axis on the chip.

While the arrangement of the two detectors on the same surface also supporting the BAW resonator was described, the detectors might as well be provided on the surface opposing the surface carrying the BAW resonator. In such an embodiment, an appropriate grating can be provided in the substrate or at another appropriate position to ensure that the two shear waves are received at the detectors.

Figure 4E:
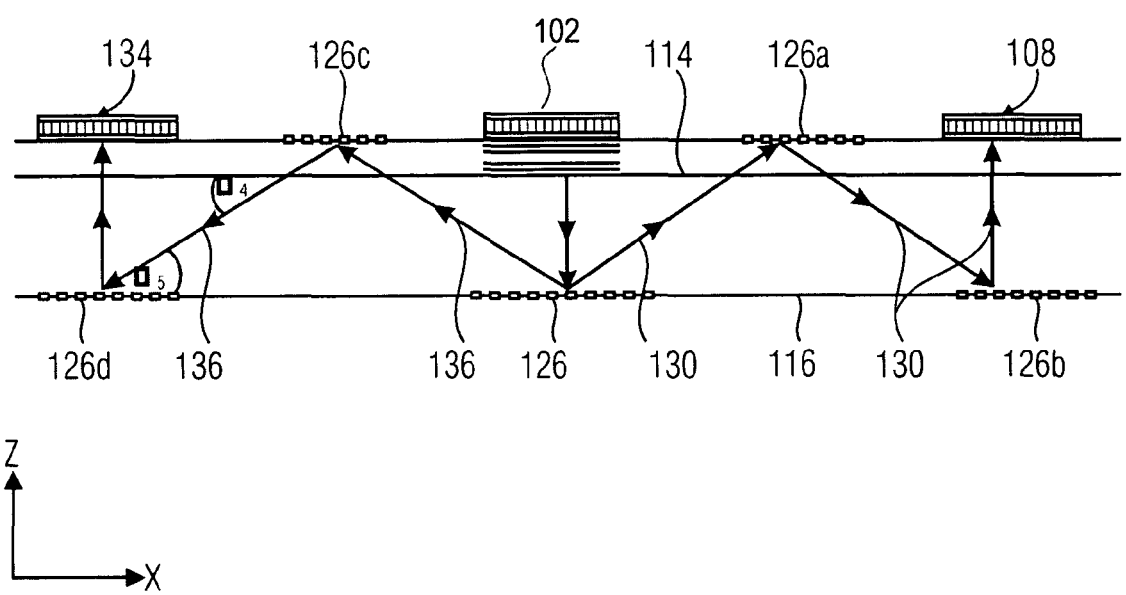
FIG. 4E is a cross-sectional view of a rotation sensor in accordance with an embodiment of the present invention having two shear-wave detectors and five shear-wave mirrors.

FIG. 4E shows a further embodiment very similar to the embodiments as shown in FIGS. 3C and 3D further reflectors are present. A second shear-wave reflector 126a is arranged between the BAW resonator 102 and the shear-wave detector 108 and a fourth shear-wave reflector 126c is arranged between the BAW resonator 102 and the further shear-wave detector 134. In addition, a third shear-wave reflector 126b is arranged on the second surface 116 under the shear-wave detector 108 and a fifth shear wave reflector 126d is arranged on the second surface 116 under the further shear-wave detector 134.

Therefore, the shear-wave 128 is reflected at the shear-wave reflector 126 into the reflected shear-wave 130 and the further reflected shear-wave 136. The reflected shear-wave 130 will undergo a second reflection at the second shear-wave reflector 126a and a third time at the third shear-wave reflector 126b. After the third reflection the propagation path of the reflected shear wave 130 is perpendicular to the first surface 114 and hence also perpendicular to the lateral surface of the shear-wave detector 108. In the same manner, the further reflected shear-wave 136 is reflected a second time at the fourth shear-wave reflector 126c and a third time at the fifth shear-wave reflector 126d. After the fourth reflection the further reflected shear-wave 136 comprises a propagation path, which is again perpendicular to the first surface 114 and hence arrive at the additional shear-wave detector 134 in a perpendicular manner.

As for the shear-wave reflectors 126 and the second and third shear-wave reflectors 126a and 126b, the adjusted characteristics of reflection, e.g., the chosen grating, of the fourth and fifth shear-wave reflectors 126c and 126d will fix the intensity of the further reflected shear-wave 136, or in other words, the reflection angles $\alpha_4$ and $\alpha_5$ of the further reflected shear-wave 136 at the fourth and fifth shear-wave reflectors 126c and 126d depend on the characteristics of reflection, e.g., the grating, of the fourth and fifth shear-wave reflectors 126c and 126d and in an embodiment the grating is chosen so the further shear-wave detector 134 receives the further reflected shear-wave 136 with a maximal intensity and perpendicular to the lateral surface of the shear wave detector 108.

As for the embodiments as shown in FIGS. 3C and 3D, also in this case perpendicular arriving shear-waves 130, 136 can be detected with an improved sensitivity without a need for adjusting the lateral dimension of the shear-wave detectors 108, 134 in order to avoid interferences (see discussion with respect to FIGS. 3A and 3B). Therefore, the embodiment of FIG. 4E gives an improvement for the detection of the arriving shear-waves 130, 136 in the shear-wave detectors 108, 134 compared to the arriving of inclined shear-waves as shown in FIG. 4A.

In further embodiments additional shear reflectors can be added so that after an even number of reflections the shear wave detector 108 on the second surface 116 can detect the reflected perpendicular shear wave 130 or after an odd number of reflections the shear wave detector 108 on the first surface 114 can detect the reflected perpendicular shear wave 130.

Figure 5:
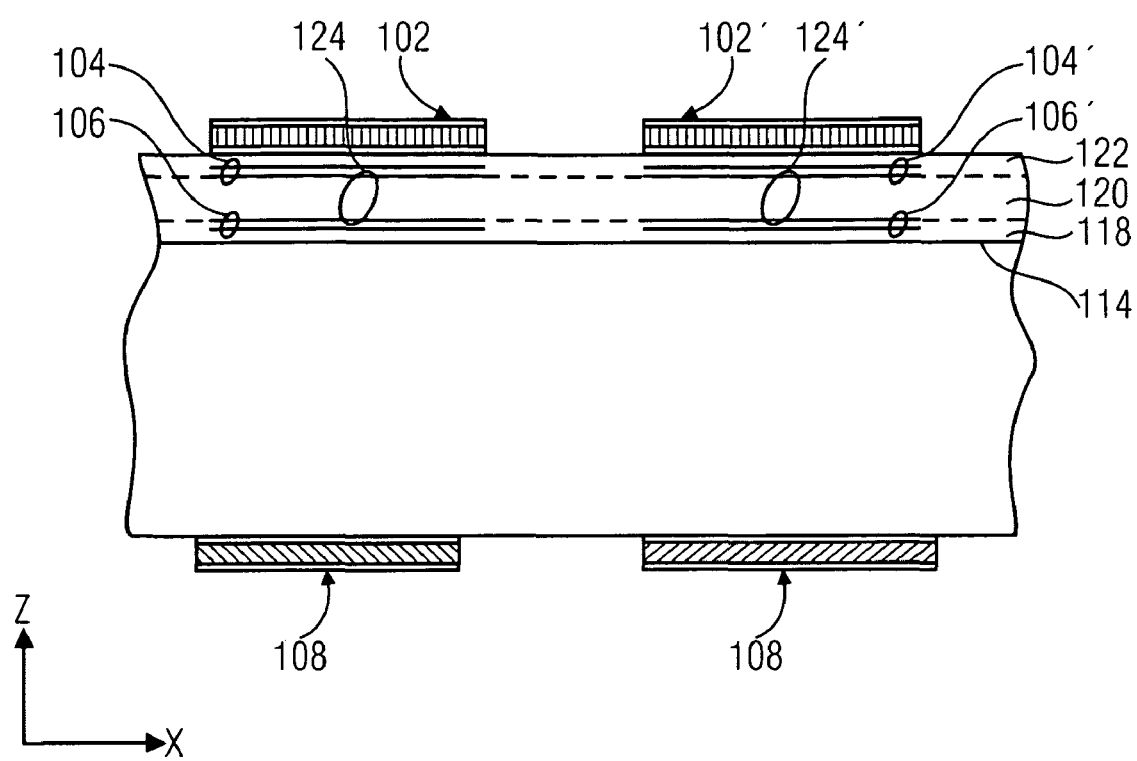
FIG. 5 is a cross-sectional view of a rotation sensor in accordance with an embodiment of the present invention having two bulk-acoustic-wave resonators arranged at an upper surface of a substrate and two shear-wave detectors arranged at a lower surface of a substrate.

In further embodiments, an additional structure is added to the structure shown in FIG. 2. As is shown in FIG. 5, the arrangement of FIG. 2 is basically duplicated, i.e., an additional BAW resonator 102', an additional shear-wave isolator 104', an additional shear-wave transparent mirror 106' and an additional shear-wave detector 108' are provided at about 90° with respect to the arrangement as shown in FIG. 2. this arrangement allows the detection of a rotation about the x-axis and the y-axis. In another embodiment, a single BAW resonator can be used while the shear waves generated by the rotation about the respective axes is reflected towards the respective detectors 108, 108', wherein the shear-wave detectors 108, 108' comprise two different tilted grain layers in order to be sensible with respect to two different rotations.

While the above described embodiments comprise the three layers 118, 120 and 122 on the upper surface 114 of the substrate 112, the present invention is not limited to such an arrangement. Instead of providing three layers 118, 120 and 122, also a single layer having the appropriate acoustic properties could be used. In such an embodiment the respective elements, i.e., the shear-wave transparent mirror, the shear-wave isolator and the Coriolis zone are arranged at respective depths within the single layer. Dependent on the specific properties desired, the shear-wave transparent mirror and the shear-wave isolator comprise one or more layers with alternating materials of different acoustic impedances and/or different thicknesses.

Also, instead of providing the shear-wave detectors on the layer 122, the shear-wave detectors might as well be provided inside the layers 118, 120, 122 or the single layer. Alternatively, the shear-wave detectors might be provided on the upper surface 114 of the substrate 112.

The materials used in BAW technologies depend on the manufacturing process. The layers 118, 120, 122 comprise a material having low acoustic impedance, for example, silicon dioxide ($SiO_2$), wherein the layers 104 and 106, respectively, comprise a material having a high acoustic impedance, for example, tungsten (W). Examples for piezoelectric materials comprise aluminium nitride (AlN), zinc oxide (ZnO) or strontium titanate ($SrTiO_3$). The separation of the different layers in the shear-wave isolator is, e.g., one quarter of the wavelength of the acoustic shear wave and in the shear-wave transparent mirror 106 is, e.g., one quarter of the wavelength of an acoustic longitudinal wave. The thicknesses of the layers depend on the wavelength of the wave and will fix the reflection properties and hence determine the quality of the mirrors and/or resonators.

While the inventive rotation sensor has its applicability in all fields being in need of sensing a rotation, fields of application range from automotive safety over navigation systems to consumer applications such as cameras and game consoles.

What is claimed is:

1. A rotation detection apparatus, comprising:
   a first generator configured to generate a longitudinal bulk-acoustic-wave that propagates in a propagation direction;
   a second generator configured to generate a shear-wave from the longitudinal bulk-acoustic wave upon rotation by an acting Coriolis force; and
   a detector to detect the shear-wave,
   wherein the second generator is arranged in the propagation direction between the first generator and the detector.

2. The rotation detection apparatus according to claim 1, wherein the first generator comprises a bulk-acoustic-wave resonator.

3. The rotation detection apparatus according to claim 1, further comprising a filter configured to filter the longitudinal bulk-acoustic-wave by suppressing longitudinal waves, the filter being arranged between the second generator and the detector.

4. The rotation detection apparatus according to claim 1, further comprising a suppressor configured to suppress the shear-wave, the suppressor arranged in a propagation direction of the shear-wave after the first generator.

5. The rotation detection apparatus according to claim 1, further comprising at least one reflector configured to reflect the shear-wave towards the detector.

6. The rotation detection apparatus according to claim 1, further comprising a determiner configured to determine rotation on the basis of a signal from the detector, the determiner generating a signal in case of an occurrence of the rotation.

7. The rotation detection apparatus according to claim 6, further comprising a further detector configured to detect a shear-wave, wherein the determiner determines the rotation based on a differential signal from the detector and from the further detector.

8. The rotation detection apparatus according to claim 6, further comprising a further detector configured to detect the shear-wave, wherein the determiner determines the rotation around a first axis of rotation based on a signal from the detector, and wherein the determiner determines the rotation around a second axis of rotation based on a signal from the further detector.

9. A rotation sensor, comprising:
a substrate;
a bulk-acoustic-wave generator disposed on the substrate;
a Coriolis zone arranged in a direction wherein a longitudinal bulk-acoustic-wave generated by the bulk-acoustic-wave generator propagates, and wherein an acting Coriolis force generates a shear-wave upon rotation from the longitudinal bulk-acoustic-wave; and
a shear-wave detector arranged on the substrate in a direction in which the shear-wave propagates.

10. The rotation sensor according to claim 9, wherein the bulk-acoustic-wave generator comprises a bulk-acoustic-wave resonator.

11. The rotation sensor according to claim 9, further comprising a shear-wave transparent mirror arranged between the substrate and the bulk-acoustic-wave generator.

12. The rotation sensor according to claim 11, further comprising a shear-wave isolator arranged between the bulk-acoustic-wave generator and the shear-wave transparent mirror, wherein the shear-wave isolator and the shear-wave transparent mirror are separated from each other to define the Coriolis zone.

13. The rotation sensor according to claim 9, further comprising a shear-wave reflector arranged on the substrate in a path along which the shear-wave propagates between the bulk-acoustic-wave generator and the shear-wave detector.

14. The rotation sensor according to claim 13, wherein the substrate comprises a line grating at one surface thereof, the line grating defining the shear-wave reflector.

15. The rotation sensor according to claim 9, further comprising an even number of shear-wave reflectors arranged on the substrate in a path along which the shear-wave propagates between the bulk-acoustic-wave generator and the shear-wave detector, the shear-wave reflectors being arranged on opposite surfaces of the substrate.

16. The rotation sensor according to claim 9, comprising an odd number of shear-wave reflectors arranged on the substrate in a path along which the shear-wave propagates between the bulk-acoustic-wave generator and the shear-wave detector, the shear-wave reflectors being arranged on a same surface of the substrate.

17. The rotation sensor according to claim 13, wherein the substrate comprises a dot grating at one surface thereof, the dot grating defining the shear-wave reflector.

18. The rotation sensor according to claim 9, further comprising a signal processing circuit, the signal processing circuit comprising an input for an output signal from the shear-wave detector and an output for a rotation signal.

19. The rotation sensor according to claim 18, further comprising a further shear-wave detector disposed on the substrate, wherein the signal processing circuit comprises a further input for an output signal from the further shear-wave detector, and wherein the output of the signal processing circuit is a rotation signal based on a difference between the output signal from the shear-wave detector and the output signal from the further shear-wave detector.

20. The rotation sensor according to claim 18, further comprising a further shear-wave detector disposed on the substrate, wherein the signal processing circuit comprises a further input for an output signal from the further shear-wave detector and a further output, wherein the output of the signal processing circuit is a rotation signal about a first axis based on the output signal from the shear-wave detector, and wherein the further output is a rotation signal about a second axis based on the output signal from the further shear-wave detector.

21. The rotation sensor according to claim 9, wherein the shear-wave detector comprises a tilted grain piezoelectric layer.

22. A rotation sensor, comprising:
a substrate comprising a first surface and a second surface;
a shear-wave transparent mirror arranged on the second surface of the substrate;
a shear-wave isolator over the shear-wave transparent mirror, wherein the shear-wave transparent mirror and the shear-wave isolator are arranged separated from each other to define a Coriolis zone there between;
a bulk-acoustic-wave resonator over the shear-wave isolator; and
a shear-wave detector arranged on the substrate in a direction in which a shear-wave generated upon rotation from a longitudinal bulk-acoustic-wave generated by the bulk-acoustic-wave resonator propagates.

23. The rotation sensor according to claim 22, wherein the shear-wave detector is arranged on the second surface of the substrate substantially opposite to the bulk-acoustic-wave resonator.

24. The rotation sensor according to claim 22, further comprising a shear-wave reflector arranged on the second surface of the substrate substantially opposite to the bulk-acoustic-wave resonator, wherein the shear-wave detector is arranged at the first surface of the substrate.

25. The rotation sensor according to claim 24, further comprising a layer arranged on the first surface of the substrate, wherein the bulk-acoustic-wave resonator is arranged on the layer, wherein the shear-wave transparent mirror and the shear-wave isolator are arranged within the layer below the bulk-acoustic-wave resonator, and wherein the shear-wave detector is arranged on the layer laterally spaced from the bulk-acoustic-wave resonator.

26. The rotation sensor according to claim 22, further comprising an even number of shear-wave reflectors arranged on the substrate in a path along which the shear-wave propagates between the bulk-acoustic-wave resonator and the shear-wave detector, the shear-wave reflectors being arranged on opposite surfaces of the substrate.

27. The rotation sensor according to claim 22, further comprising an odd number of shear-wave reflectors arranged on the substrate in a path along which the shear-wave propagates between the bulk-acoustic-wave resonator and the shear-wave detector, the shear-wave reflectors being arranged on a same surface of the substrate.

28. A method for detecting a rotation, comprising:
generating a longitudinal bulk-acoustic-wave propagating in a propagation direction; and
generating a shear-wave from the longitudinal bulk-acoustic-wave upon rotation by an acting Coriolis force, the shear-wave being generated in the propagation direction of the longitudinal bulk-acoustic wave; and
detecting the shear-wave generated from the longitudinal bulk-acoustic wave upon rotation.

29. The method according to claim 28, further comprising filtering the longitudinal bulk-acoustic wave to suppress longitudinal waves.

30. The method according to claim 28, further comprising determining the rotation on the basis of the detected shear-wave.

31. The method according to claim 28, further comprising reflecting the shear-wave and detecting a reflected shear-wave.

* * * * *